US012521845B2

(12) United States Patent
Chen et al.

(10) Patent No.: US 12,521,845 B2
(45) Date of Patent: Jan. 13, 2026

(54) TWO-SIZE SOCKET TOOL

(71) Applicant: YUAN LI HSING INDUSTRIAL CO., LTD., Taichung (TW)

(72) Inventors: Chia-Yi Chen, Taichung (TW); Hui-Chien Chen, Taichung (TW)

(73) Assignee: YUAN LI HSING INDUSTRIAL CO., LTD., Taichung (TW)

( * ) Notice: Subject to any disclaimer, the term of this patent is extended or adjusted under 35 U.S.C. 154(b) by 387 days.

(21) Appl. No.: 18/456,722

(22) Filed: Aug. 28, 2023

(65) Prior Publication Data

US 2025/0073860 A1 Mar. 6, 2025

(51) Int. Cl.
*B25B 13/10* (2006.01)

(52) U.S. Cl.
CPC .................................. *B25B 13/102* (2013.01)

(58) Field of Classification Search
CPC .......................... B25B 13/102; B25B 23/0007
See application file for complete search history.

(56) References Cited

U.S. PATENT DOCUMENTS 2,938,417 A * 5/1960 Haber ................... B25B 13/102
81/185
7,252,022 B1 * 8/2007 Losee ................... B25B 13/102
81/124.5
10,953,521 B2 * 3/2021 Zimmermann ....... B25B 13/065
11,090,782 B2 * 8/2021 Chiang ................... B25B 13/28
11,203,097 B2 * 12/2021 Chiang ................. B25B 13/102
12,128,529 B1 * 10/2024 Lark ................... B25B 23/0035
2012/0137837 A1 * 6/2012 Souma .................. B25B 13/102
81/124.5
2015/0135504 A1 * 5/2015 East ...................... B25B 13/102
29/428
2015/0151412 A1 * 6/2015 Chen ................... B25B 23/0035
81/124.5
2020/0290179 A1 * 9/2020 Chiang ................. B25B 13/102

FOREIGN PATENT DOCUMENTS

JP 2001353664 A * 12/2001
JP 2008188679 A * 8/2008

* cited by examiner

*Primary Examiner* — David B. Thomas
(74) *Attorney, Agent, or Firm* — MUNCY, GEISSLER, OLDS & LOWE, P.C.

(57) ABSTRACT

A two-size socket tool is provided, wherein the two-size socket tool includes: an outer sleeve including a socket hole, a receiving hole in communication with the socket hole, and a radial protrusion radially protruding between the socket hole and the receiving hole; an inner sleeve non-rotatably inserted in the outer sleeve and including an inner sleeving portion and a connection section connected to each other by insertion, the inner sleeving portion being received in the socket hole and blockable by the radial protrusion, the connection section extending from the inner sleeving portion toward the receiving hole; and a first elastic member received in the receiving hole and between the radial protrusion and the inner sleeve.

10 Claims, 5 Drawing Sheets

TWO-SIZE SOCKET TOOL

BACKGROUND OF THE INVENTION

Field of the Invention

The present invention relates to a two-size socket tool.

Description of the Prior Art

Fasteners are often used in many kinds of products to assemble different components. Fasteners, such as screws, nuts, bolts or the like, are tightened or untightened by turning. When turning the fastener, it is usually necessary to use a socket on the fastener, and it is also necessary to connect the socket to an elongated driver to perform the rotational operation.

In order to be applicable to fasteners of various sizes, a multi-size socket tool has been developed. The conventional multi-size socket tool includes a plurality of sleeves movably sleeved with each other, and a rod member protrusive out beyond the sleeves. The rod member is configured to be connected to a driving tool (manual or power tool). The sleeves and the rod member are all independent components and are assembled with each other by at least one retainer (such as C-shaped retainer or ring buckle) or at least one stopper to complete the connection thereof.

Although the conventional multi-size socket tool is applicable to fasteners of various sizes, the structure is complicated, and it is difficult and time-consuming to assembly and manufacture.

The present invention is, therefore, arisen to obviate or at least mitigate the above-mentioned disadvantages.

SUMMARY OF THE INVENTION

The main object of the present invention is to provide a two-size socket tool which is simple in structure, quick and easy to manufacture, and capable of being applied to fasteners of various sizes.

To achieve the above and other objects, a two-size socket tool is provided, wherein the two-size socket tool includes: an outer sleeve including a socket hole, a receiving hole in communication with the socket hole, and a radial protrusion radially protruding between the socket hole and the receiving hole; an inner sleeve non-rotatably inserted in the outer sleeve and including an inner sleeving portion and a connection section connected to each other by insertion, the inner sleeving portion being received in the socket hole and blockable by the radial protrusion, the connection section extending from the inner sleeving portion toward the receiving hole; and a first elastic member received in the receiving hole and between the radial protrusion and the inner sleeve.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
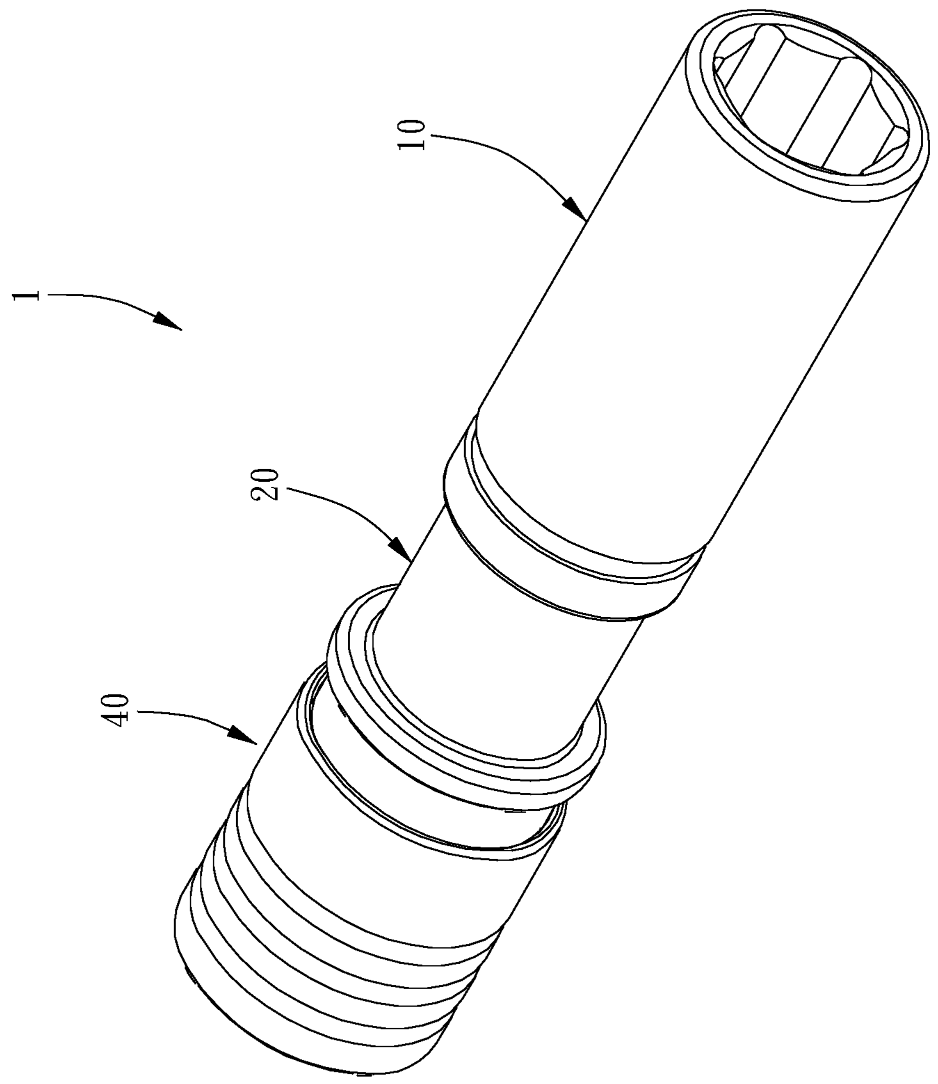
FIG. 1 is a stereogram of an exemplary embodiment of the present invention.
Figure 2:
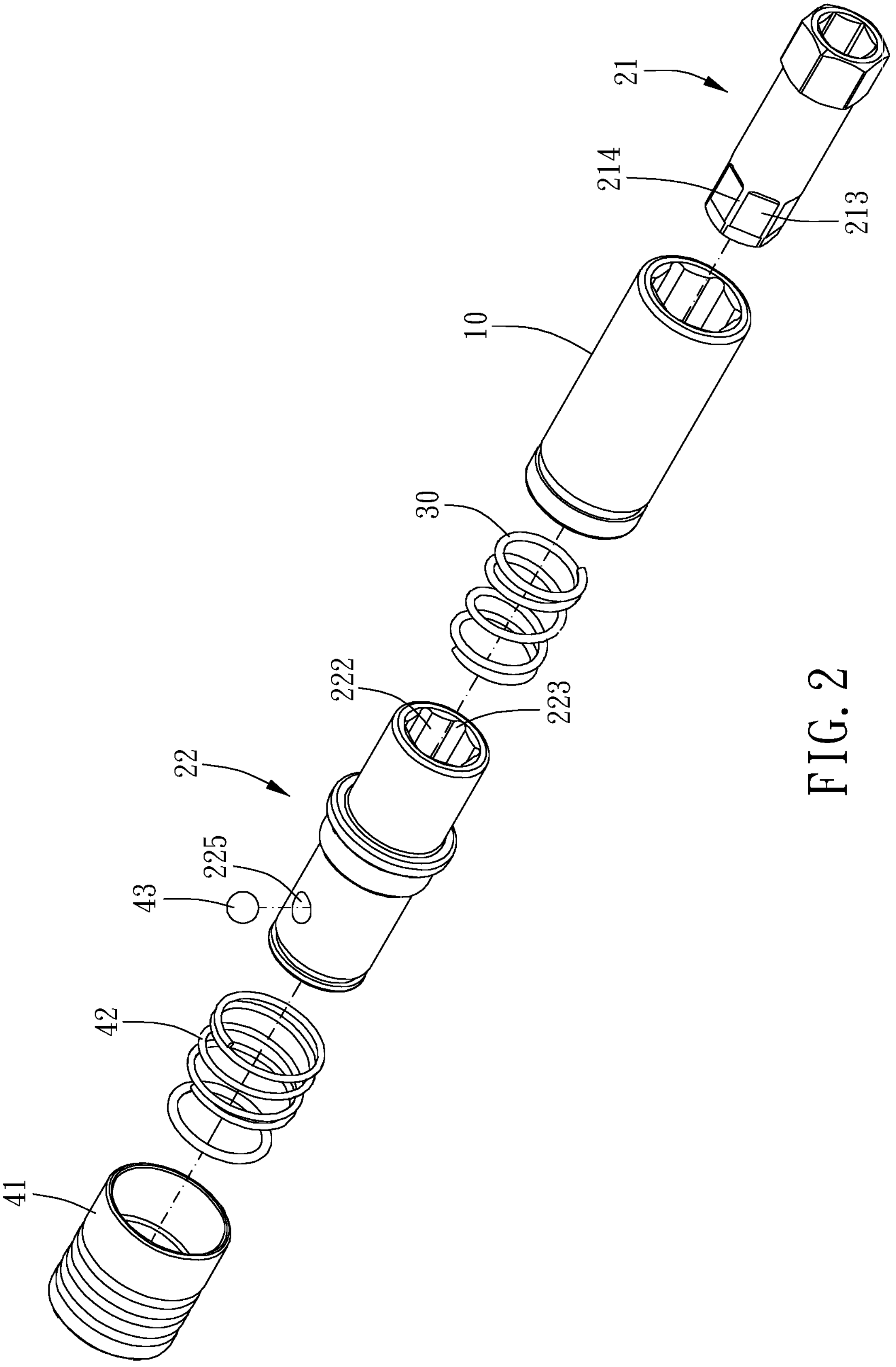
FIG. 2 is a breakdown drawing of an exemplary embodiment of the present invention.
Figure 3:
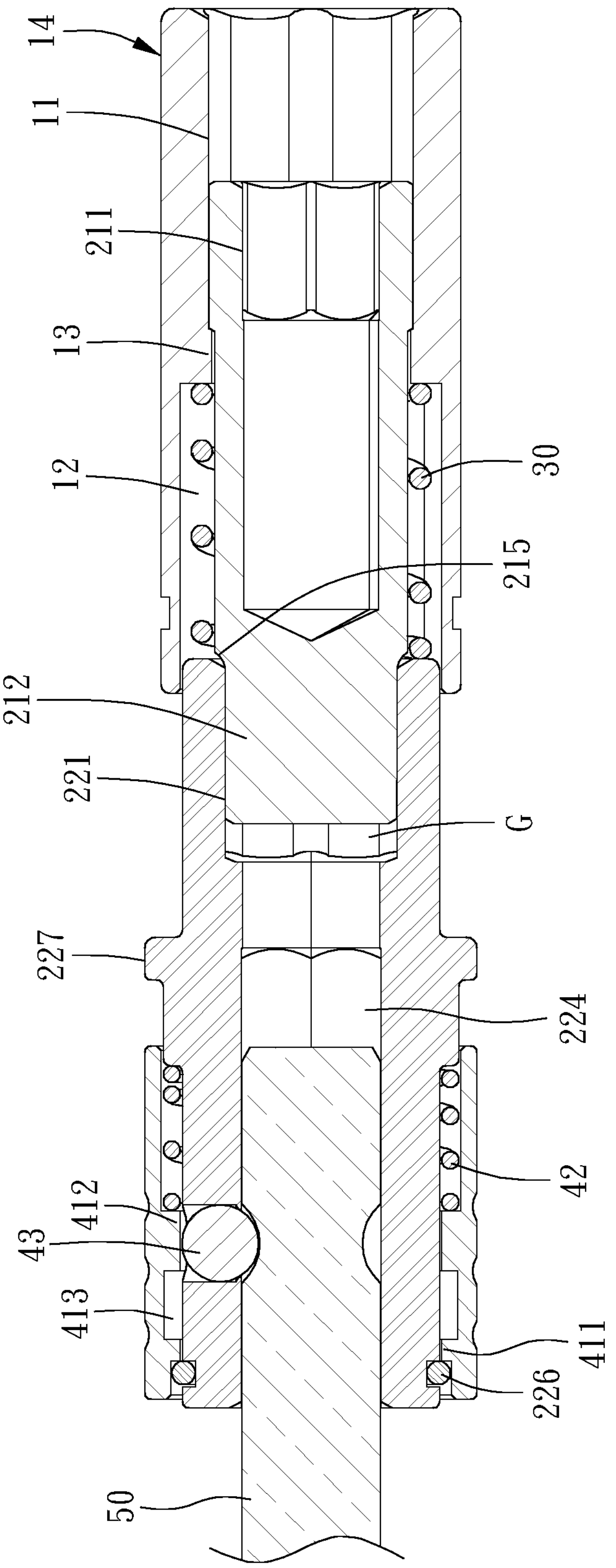
FIG. 3 is a cross-sectional view of an exemplary embodiment of the present invention.
Figure 4:
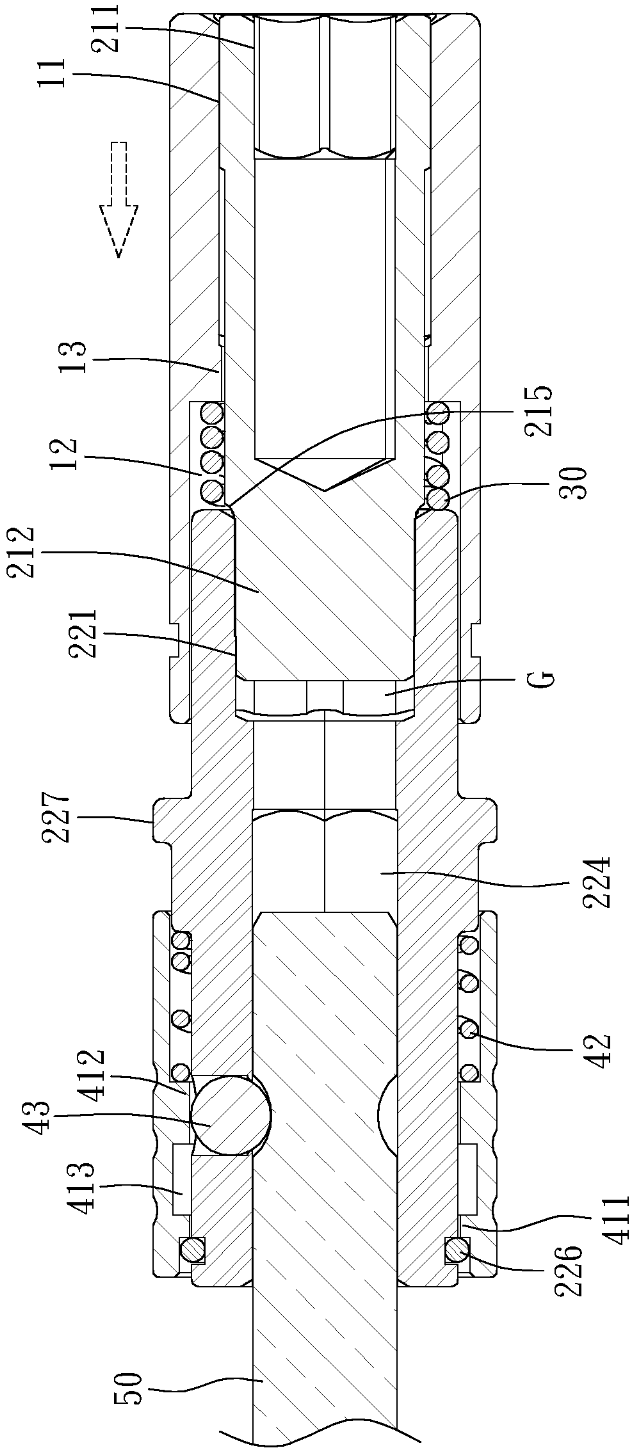
FIGS. 4 and 5 are drawings showing operation of an exemplary embodiment of the present invention.

Please refer to FIGS. 1 to 5 for an exemplary embodiment of the present invention. A two-size socket tool 1 of the present invention includes an outer sleeve 10, an inner sleeve 20 and a first elastic member 30.

The outer sleeve 10 includes a socket hole 11, a receiving hole 12 in communication with the socket hole 11, and a radial protrusion 13 radially protruding between the socket hole 11 and the receiving hole 12. The inner sleeve 20 is non-rotatably inserted in the outer sleeve 10, the inner sleeve 20 includes an inner sleeving portion 21 and a connection section 22 connected to each other by insertion, the inner sleeving portion 21 is received in the socket hole 11 and axially blockable by the radial protrusion 13, and the connection section 22 extends from the inner sleeving portion 21 toward the receiving hole 12. The first elastic member 30 is received in the receiving hole 12 and disposed between the radial protrusion 13 and the inner sleeve 20. As such, it is simple in structure, quick and easy to manufacture, and capable of being applied to fasteners of various sizes.

The outer sleeve 10 further includes an outer sleeving portion 14 including the socket hole 11, and the inner sleeving portion 21 is thinner than the outer sleeving portion 14. The socket hole 11 of the outer sleeving portion 14 is configured to receive a fastener (such as nut, bolt or the like) having a relatively larger size, and a socket hole 211 of the inner sleeving portion 21 is configured to receive a fastener having a relatively smaller size. The outer sleeving portion 14 which is relatively thicker has a strong structure for driving the fastener having the relatively larger size, avoiding being broken. The inner sleeving portion 21 includes an insertion end 212, the connection section 22 includes an insertion hole 221, the insertion hole 221 has a diametric dimension equal to or slightly smaller than a diametric dimension of the insertion end 212, the insertion end 212 is inserted in the insertion hole 221 in tight fit, so that it is easy, quick and stably to connect the inner sleeving portion 21 and the connection section 22.

In this embodiment, the insertion end 212 is polygonal and the insertion hole 221 is polygonal; however, the insertion end 212 and the insertion hole 221 may be circular or any non-circular configuration, as long as they can be connected to each other in tight fit. Specifically, the insertion end 212 includes a plurality of outer planes 213 and the plurality of ridges 214, the insertion hole 221 includes a plurality of inner planes 222 and a plurality of grooves 223, the plurality of outer planes 213 are abutted against the plurality of inner planes 222 in tight fit, and the plurality of ridges 214 are gappedly received in the plurality of grooves 223.

Preferably, the insertion end 212 includes a curved surface 215 extending within the insertion hole 221, an end of the connection section 22 lodges in the curved surface 215, and the curved surface 215 extends toward the outer sleeve 10, so that it ensures that the insertion end 212 can be firmly inserted in the insertion hole 221 in tight fit and avoid over-insertion of the insertion end 212. In this embodiment, there is a gap G between an end surface of the insertion end 212 and a bottom surface of the insertion hole 221, which provides a good and strong connection.

The inner sleeving portion 21 is diametrically smaller than the connection section 22, and the first elastic member

30 is abutted against and between the radial protrusion 13 and the inner sleeving portion 21. Specifically, the first elastic member 30 is a coil spring and disposed around the inner sleeving portion 21, the first elastic member 30 urges the connection section 22 so that the socket hole 211 of the inner sleeving portion 21 is entirely within the socket hole 11 of the outer sleeving portion 14, and thus it is quick to use the socket hole 11 of the outer sleeving portion 14 without interfering with the inner sleeving portion 21.

Figure 5:
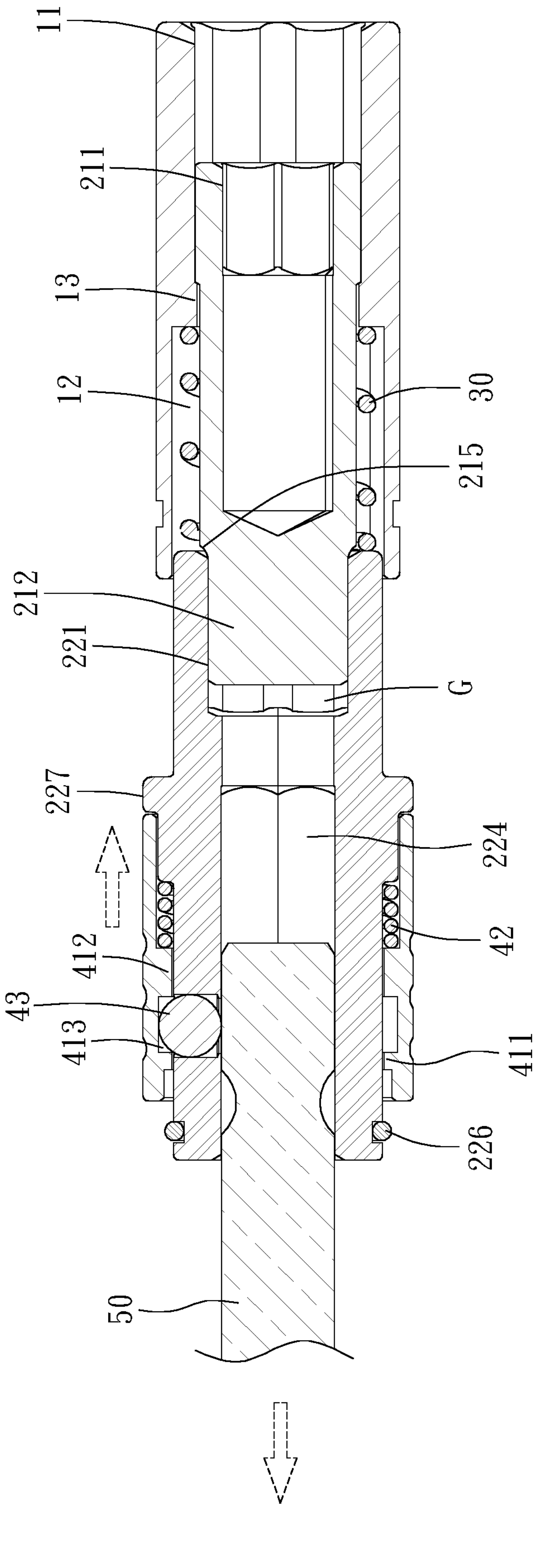

In this embodiment, the two-size socket tool 1 further includes a locking mechanism 40 disposed on the connection section 22, and the locking mechanism 40 is movable between a locking position (FIG. 4) and a release position (FIG. 5). When the locking mechanism 40 is located in the release position, it allows a rod member 50 to be inserted in or removed from a connection hole 224 of the connection section 22. When the locking mechanism 40 is located in the locking position, the locking mechanism 40 locks the rod member 50 inserted in the connection hole 224. As such, it is easy and quick to assemble or replace. The rod member 50 is, for example, a rod that can be assembled to a driving tool, or the rod member 50 can be a driving tool head (such as a flathead screwdriver, Phillips screwdriver or the like).

Specifically, the connection section 22 further includes a radial through hole 225 and a radial protrusive portion 226 (one-piece projection or C-shaped retainer), and the locking mechanism 40 includes a slidable sleeve 41, a second elastic member 42 and a detent member 43. The slidable sleeve 41 is slidably disposed around the connection section 22, and the slidable sleeve 41 includes an inner blocking portion 411, an inner projection 412 and a recess 413. The inner blocking portion 411 is axially blocked by the radial protrusive portion 226, the second elastic member 42 is a coil spring and disposed around the connection section 22, the second elastic member 42 is abutted against and between the connection section 22 and the inner projection 412, and the detent member 43 is received in the radial through hole 225. When the locking mechanism 40 is located in the release position, the detent member 43 corresponds to the recess 413 so that the rod member 50 is released. When the locking mechanism 40 is located in the locking position, the detent member 43 corresponds to the inner projection 412 so that the rod member 50 is locked.

Preferably, the connection section 22 further includes an outer flange 227, the slidable sleeve 41 is located between the radial protrusive portion 226 and the outer flange 227, and the slidable sleeve 41 is movable to contact the outer flange 227, so that the recess 413 can align with the detent member 43 (FIG. 5) quickly and precisely.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A two-size socket tool including:

an outer sleeve including a socket hole, a receiving hole in communication with the socket hole, and a radial protrusion radially protruding between the socket hole and the receiving hole;

an inner sleeve non-rotatably inserted in the outer sleeve and including an inner sleeving portion and a connection section connected to each other by insertion, the inner sleeving portion being received in the socket hole and blockable by the radial protrusion, the connection section extending from the inner sleeving portion toward the receiving hole; and a first elastic member received in the receiving hole and between the radial protrusion and the inner sleeve.

2. The two-size socket tool of claim 1, wherein the inner sleeving portion includes an insertion end, the connection section includes an insertion hole, and the insertion end is inserted in the insertion hole in tight fit.

3. The two-size socket tool of claim 2, wherein the insertion end is polygonal, and the insertion hole is polygonal.

4. The two-size socket tool of claim 3, wherein the insertion end includes a curved surface extending within the insertion hole, and end of the connection section lodges in the curved surface, and the curved surface extends toward the outer sleeve; the inner sleeving portion is diametrically smaller than the connection section, and the first elastic member is abutted against and between the radial protrusion and the inner sleeving portion; the outer sleeve further includes an outer sleeving portion including the socket hole, and the inner sleeving portion is thinner than the outer sleeving portion; the first elastic member is a coil spring; there is a gap between an end surface of the insertion end and a bottom surface of the insertion hole; the insertion end includes a plurality of outer planes and the plurality of ridges, the insertion hole includes a plurality of inner planes and a plurality of grooves, the plurality of outer planes are abutted against the plurality of inner planes in tight fit, and the plurality of ridges are gappedly received in the plurality of grooves.

5. The two-size socket tool of claim 2, wherein the insertion end includes a curved surface extending within the insertion hole, an end of the connection section lodges in the curved surface, and the curved surface extends toward the outer sleeve.

6. The two-size socket tool of claim 1, wherein the inner sleeving portion is diametrically smaller than the connection section, and the first elastic member is abutted against and between the radial protrusion and the inner sleeving portion.

7. The two-size socket tool of claim 1, wherein the outer sleeve further includes an outer sleeving portion including the socket hole, and the inner sleeving portion is thinner than the outer sleeving portion.

8. The two-size socket tool of claim 1, further including a locking mechanism disposed on the connection section, wherein the locking mechanism is movable between a locking position and a release position, when the locking mechanism is located in the release position, it allows a rod member to be inserted in or removed from a connection hole of the connection section, and when the locking mechanism is located in the locking position, the locking mechanism locks the rod member inserted in the connection hole.

9. The two-size socket tool of claim 8, wherein the connection section further includes a radial through hole and a radial protrusive portion, the locking mechanism includes a slidable sleeve, a second elastic member and a detent member, the slidable sleeve is slidably disposed around the connection section, the slidable sleeve includes an inner blocking portion, an inner projection and a recess, the inner blocking portion is axially blocked by the radial protrusive portion, the second elastic member is abutted against and between the connection section and the inner projection, the detent member is received in the radial through hole, when the locking mechanism is located in the release position, the detent member corresponds to the recess so that the rod member is released, and when the locking mechanism is located in the locking position, the detent member corresponds to the inner projection so that the rod member is locked.

10. The two-size socket tool of claim 9, wherein the connection section further includes an outer flange, the slidable sleeve is located between the radial protrusive portion and the outer flange, and the slidable sleeve is movable to contact the outer flange.

* * * * *